United States Patent
Bird et al.

(10) Patent No.: US 6,223,281 B1
(45) Date of Patent: *Apr. 24, 2001

(54) METHOD OF CONTROLLING THE DEGREE OF PARALLELISM WHEN PERFORMING PARALLEL PROCESSING ON AN INHERENTLY SERIAL COMPUTER PROGRAM

(75) Inventors: Colin Leonard Bird, Eastleigh (GB); Christoph Lingenfelder, Herrenberg (DE); Robert William Phippen, Romsey; Graham Derek Wallis, West Wellow, both of (GB)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/893,077

(22) Filed: Jul. 15, 1997

(30) Foreign Application Priority Data

Jul. 31, 1996 (GB) .................................................. 9616075

(51) Int. Cl.⁷ .................................................. G06F 11/00
(52) U.S. Cl. .............................. 712/241; 712/28; 717/5; 717/6; 717/7; 717/8; 717/9
(58) Field of Search .................... 395/800.28, 800.3, 395/800.23, 800.32; 712/1, 2, 4, 7, 8, 9, 28, 241; 717/6, 5, 7, 8, 9

(56) References Cited

U.S. PATENT DOCUMENTS

| | | | |
|---|---|---|---|
| 4,901,224 | * 2/1990 | Ewert | 395/800.14 |
| 4,980,824 | 12/1990 | Tulpule et al. | 395/676 |
| 5,088,034 | * 2/1992 | Ihara et al. | 395/706 |
| 5,148,547 | * 9/1992 | Kahle et al. | 395/800.22 |
| 5,151,991 | * 9/1992 | Iwasawa et al. | 395/706 |
| 5,230,053 | * 7/1993 | Zaiki | 395/706 |
| 5,506,998 | * 4/1996 | Kato et al. | 395/800.29 |

FOREIGN PATENT DOCUMENTS

| | | |
|---|---|---|
| 2261968 | 6/1993 | (GB) . |
| WO96/02883 | 2/1996 | (WO) . |

* cited by examiner

Primary Examiner—Zarni Maung
Assistant Examiner—Dzung C. Nguyen
(74) Attorney, Agent, or Firm—David J. Kappos; Timothy M. Farrell

(57) ABSTRACT

An inherently serial program is processed in parallel, thus leading to higher processing speeds, while maintaining a close approximation to the specific result obtained through a serial running of the program. This goal has been attained based on the fact that the desired degree of closeness between a parallel result and the serial result depends on the particular inherently serial program being run and the type of analysis being performed. That is, some inherently serial processes require a "fine-tuned" result while for others a "coarser" result is acceptable. The frequency at which the parallel branches consolidate their respective results is changed accordingly to alter the degree of closeness between the parallel processed result and the serially processed result.

9 Claims, 2 Drawing Sheets

METHOD OF CONTROLLING THE DEGREE OF PARALLELISM WHEN PERFORMING PARALLEL PROCESSING ON AN INHERENTLY SERIAL COMPUTER PROGRAM

FIELD OF THE INVENTION

The present invention relates to data processing and specifically to a method of processing data using a parallel form of an algorithm which is normally run serially.

BACKGROUND OF THE INVENTION

An inherently serial data processing program is one in which a data processing unit processes program steps one-at-a-time and each successive step of the program further changes the results of the preceding step. Thus, each program step changes the total state of the data processing result in a serial fashion. These types of inherently serial programs can often be computation intensive. For example, data mining programs involve a large quantity of data records being analyzed in order to determine previously hidden trends or groupings in such data. In certain types of data mining algorithms, each record of the database is analyzed one-after-another (serially) and the resultant model (used, e.g., in trend prediction) is continuously updated based on the results of each of the serial computations.

While such serial processing gives a very precise result (since each and every data record is used in continuously altering the resultant model), a great deal of processing time is required.

Parallel processing techniques are known, in which a plurality of data processing units are provided and a separate processing unit is assigned, for example, its own mutually exclusive set of local data items, which may be data records, to process. This greatly shortens the overall computation time. If such a technique were applied to an inherently serial process, however, results quite different from the serial case would be attained, thus dissuading such parallel techniques from being used for such an inherently serial process where a specific result is desired.

That is, in such an inherently serial process, where a specific result is required, each processing step is always performed using the state of the resultant model as it was modified by the immediately preceding processing step. This will give the specific required result, since every data record is always processed with full knowledge of how each preceding data record has altered the resultant data model. However, if the total number of data records were divided amongst a plurality of parallel processing units, each processing unit would process its local data independently of the results being attained by the other processing units. Each data record would not be processed with full knowledge of how each preceding data record has altered the resultant data model. Accordingly, parallel processing will not give the same final result as would be attained using serial processing.

Thus, parallel processing techniques have not generally been applied to inherently serial processes where a specific result is required. Parallel techniques have been instead used to run other types of programs where it is not so important to take into account the processed effect of each successive data record. Inherently serial processes in which a specific result is required thus have traditionally suffered from long computation times due to the fact that each data item must be serially processed.

SUMMARY OF THE INVENTION

According to the present invention, an inherently serial program is processed in parallel, thus leading to higher processing speeds, while maintaining a controllable approximation to the specific result obtained from a serial running of the program. This goal has been attained based on the fact that the desired degree of closeness between a parallel result and the serial result depends on the particular inherently serial program being run and the type of analysis being performed. That is, some inherently serial processes require a "fine-tuned" result while for others a "coarser" result is acceptable.

Specifically, when the processing takes place in parallel, a processing phase occurs. The processing taking place at each parallel branch is divided into a number of parallel phases. Between these phases, the individual processing results attained by the parallel processing units of each parallel branch are combined. The number of data items processed by each processing unit of a parallel processing system during each parallel phase can be used to control the degree of closeness to the serial result. The less data items processed during each parallel phase, the closer the parallel result will be to the serial result.

During a parallel phase local data items are processed by the processing units, in such a way that each processing unit assumes that there are no other processing elements and that only the local processing unit is going to affect the resultant model. Then, after each processing unit has processed its respective set of data items, the results obtained by each processing unit are collated and the resultant model is altered based on the collated result and communicated to each of the parallel processing units. Then, each processing unit processes another set of data items and the processing, collating, resultant model altering and communicating steps are repeated until a decision is made that no more processing is required, for example, there are no more data items left to be processed. During this process the number of data items processed during each phase can be dynamically altered to correspondingly alter the degree of closeness to the result which would be attained using serial processing.

Thus, the invention is drawn to a method of computer processing an inherently serial program involving the sequential processing of data items, comprising steps of: selecting a number, nPara, of data items to be processed by each of a plurality of processing units of a parallel processing system, with the selection being dependent on the desired degree of closeness between the parallel result and the result which would be attained if the program were run serially; communicating the nPara data items to each processing unit; processing said nPara data items by each respective processing unit; collating the processing results obtained by each processing unit; altering the overall result based on the collated result; and distributing the altered overall result to each processing unit for further processing of remaining data items.

DETAILED DESCRIPTION OF THE PREFERRED EMBODIMENT

An embodiment of the present invention will now be described with reference to the figures. The description will be given of the application of the invention to an inherently serial program used in the field of data mining. In data mining, a plurality of records are stored in a large database, with each record, for example, containing details of events or objects, such as purchase transactions. Such a record may include a particular purchaser's age, salary, and purchase details (item purchased, date of purchase, price, location of purchase). A marketing department would like to analyze this database for determining purchasing trends, such as whether in a particular city people usually buy a particular item on a particular day. Marketing efforts can be adjusted accordingly, based on such discovered trends.

The data mining program, according to the preferred embodiment of the present invention, can be run on various computer platforms including the IBM RISC System/6000 Scalable POWERparallel system which can currently have 2048 processing units configured to run in parallel, (RISC System/6000 and POWERparallel are trademarks of IBM Corporation).

A number of parallel processing phases are used. During each processing phase, each processing unit processes a number of its local data records using, as a base reference, a copy of the overall model (the "frozen model") which is only current at the time of beginning a parallel phase. Each processing stage performs its computations against this frozen model, but does not change the frozen model. Instead, the result of the computation performed on each record is stored into an accumulator located in each respective processing unit. This stored result is a temporary and partial result model, referred to below as "the accumulator model". At the end of each parallel phase, the accumulator models are collated and the overall resultant model is updated based on the results of the collation. This updated overall resultant model is then used as the frozen model for the next parallel processing phase.

Figure 1:
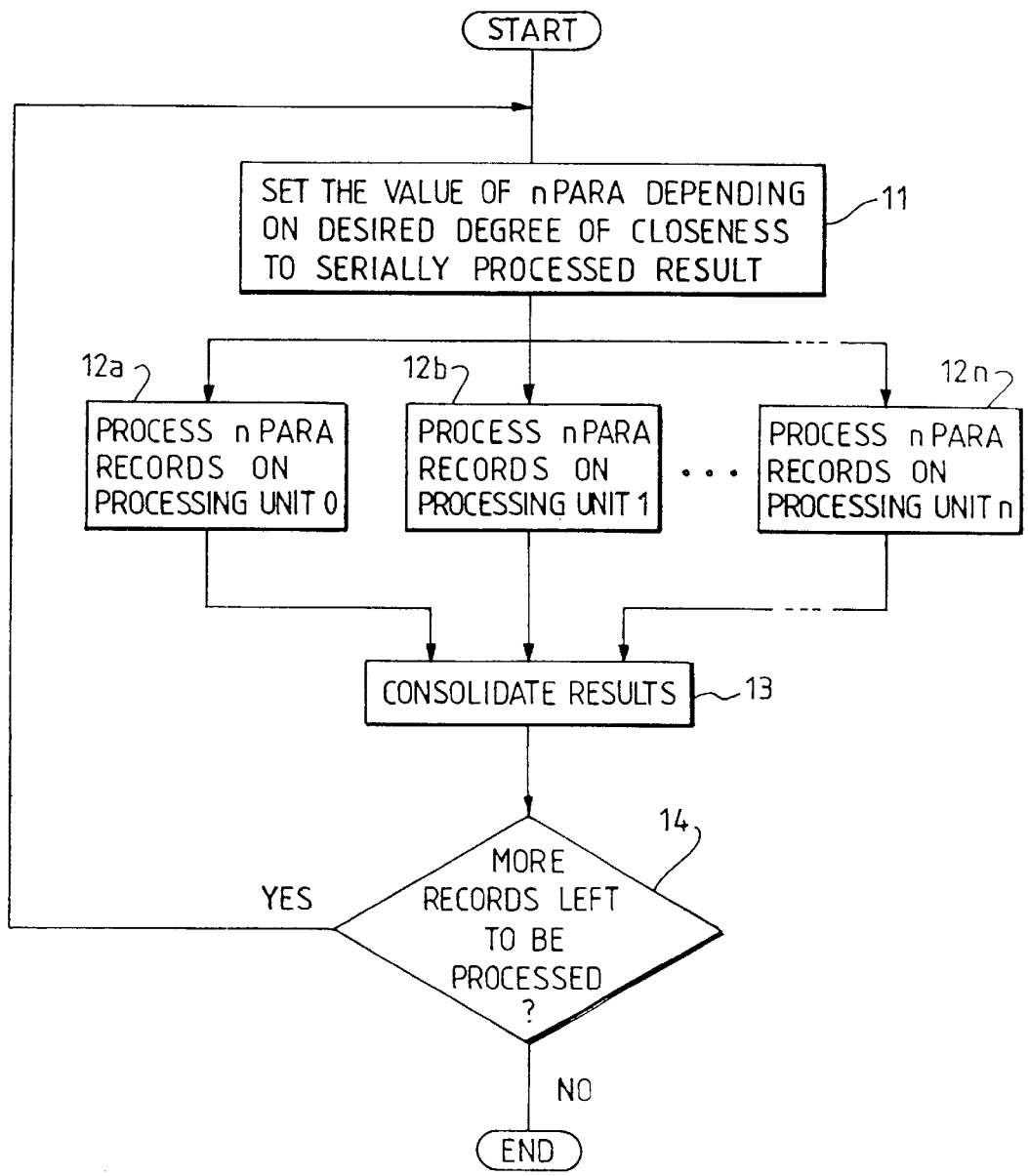
FIG. 1 is a flow chart showing the basic processing steps according to an embodiment of the present invention.

In FIG. 1, a first step 11 is carried out in which the program sets the value of nPara, which is the number of data records which will be simultaneously processed by each parallel processing unit during parallel processing steps 12a–12n. For example, if there is a total of 100,000 data records divided equally between n=10 processing units, each processing unit would have 10,000 data records. Assuming that nPara is fixed throughout the run of the program at nPara=2000 records, there would be 5 parallel phases carried out.

The early computations can significantly affect the later behavior of the program, and in the preferred embodiment the first parallel phase is preceded by the construction of an initial model based on a sample of the total set of data records. For example, 2% of all records on all nodes are processed by using a single processing unit, and the resultant model ("the initial model") is distributed to each processing unit for use as the frozen model for the first parallel phase. This initialization of the model primes the first parallel phase and improves convergence of all the parallel computations.

Figure 2:
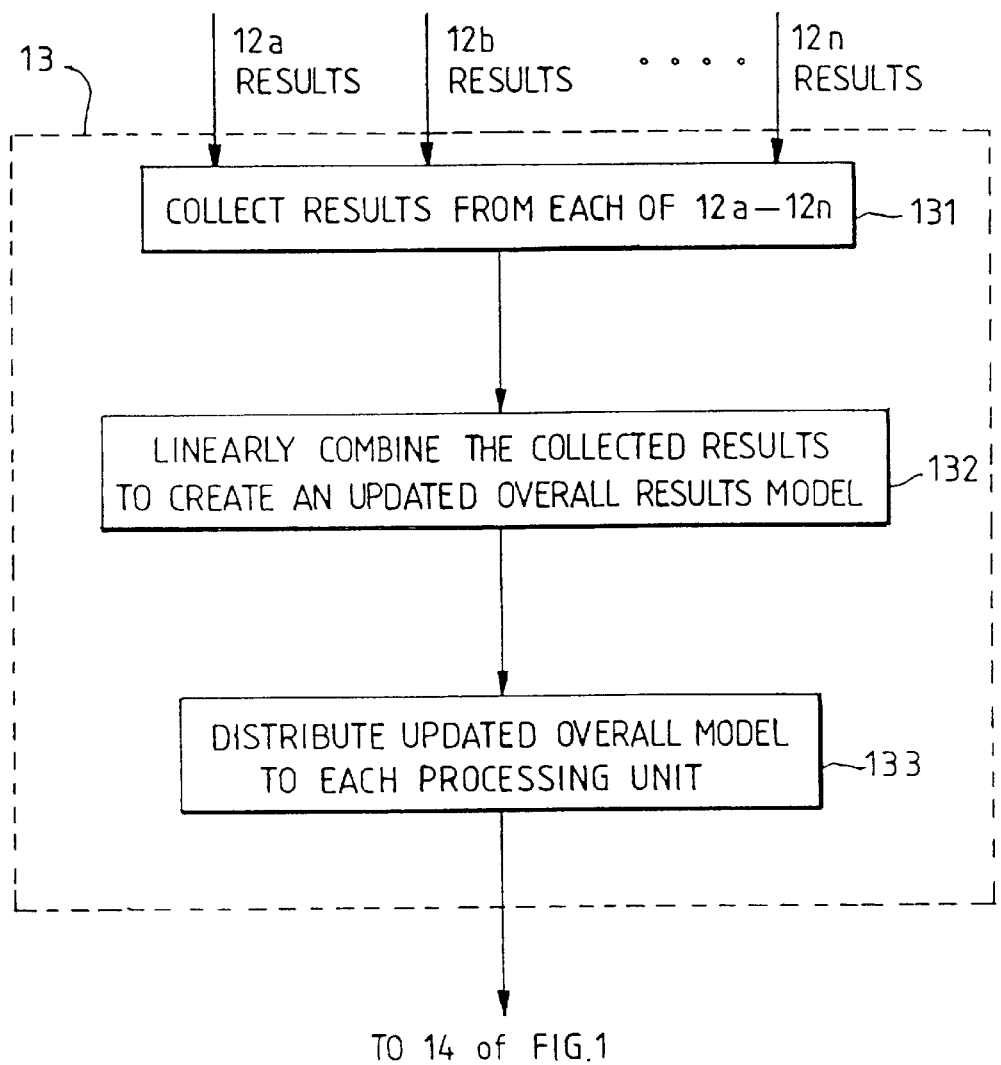
FIG. 2 is a flow chart showing the details of the "consolidate results" step of the FIG. 1 flow chart, according to an embodiment of the present invention.

At step 13, the results from each of steps 12a–12n are consolidated. That is, as shown in FIG. 2, the results from each local accumulator are collected at step 131 and linearly combined at step 132 and stored, for example, in a storage unit on one of the processing units (e.g., the one running parallel processing step 12a) which is designated the master unit, to form an updated overall resultant model which is then distributed to each parallel processing unit at step 133. Then, processing carries on to step 14 of FIG. 1 where it is judged whether or not there are any more data records left to be processed. If there are, control loops back to step 11 where the value of nPara can be altered, if desired.

If the value of nPara has been altered, the new number of data records will then be processed by each parallel processing branch 12a–12n, using the overall resultant model that was distributed to each branch at step 133 of FIG. 2. Each parallel branch starts the new phase with the same overall resultant model, and empties its accumulator model and goes on to perform its individual processing on its own local data, forming a new accumulator model. Then, the consolidation step 13 is performed again and the process continues until no more records are left to be processed (step 14).

It is important to note that this parallel process may not give the same result as if only one processing unit were performing serial processing, since each parallel branch is performing computations against the frozen model that was distributed to each branch at step 133 instead of continuously modifying the model (as would happen in the serial case). However, the degree of desired closeness between the parallel and serial results depends on the analysis being performed. Some types of analysis are required to deliver an absolute correct answer while for others there may be a number of valid answers. Thus, the present invention allows for this degree of accuracy to be varied by appropriately setting the value of nPara at step 11 before the parallel processes are initially run.

Further, by looping control from step 14 back to step 11 after every consolidation step 13, the value of nPara can be dynamically varied to alter the results while the processing is being carried out. This dynamic variation can be either manual (the results are viewed on screen by a human operator who then makes adjustments to nPara) or automatic (the computer could check the results and alter nPara in a programmed manner).

As an example of the dynamic variation of nPara, a data analyst could begin with a relatively large value of nPara and obtain a coarse result, and then progressively reduce nPara until he is satisfied that the result has converged to within a fine degree of tolerance.

It should be noted that with the present invention, this flexibility in the accuracy of result is attained by the alteration of only a single parameter, nPara. This makes the modification process very simple and time-efficient.

As will be understood by one of ordinary skill in the art, computer programs such as that described herein are typically either distributed on a computer-readable storage medium, such as a CD-ROM, as an article of manufacture having the computer program embodied therein, or distributed as a computer program product, e.g., electronically, and stored on a storage medium, such as a hard disk drive, as computer-readable program code.

While the preferred embodiment of the present invention has been described in detail, it will be understood that modifications and adaptations to the embodiment my occur to one of skill in the art without departing from the scope of the present invention as set forth in the following claims.

What is claimed is:

1. A method of computer processing an inherently serial program involving the sequential processing of data items and having a serial result, said processing by a plurality of processing units of a parallel data processing system, comprising steps of:

selecting a number, nPara, of data items to be processed by each of said plurality of processing units of said parallel processing system, said parallel processing units producing a parallel result being different than the serial result and with the selection of the number nPara of data items being dependent on desired degree of closeness between the parallel result and the serial result which would be attained if the program were run serially wherein the lesser number of data items selected causes greater closeness between the serial result and the parallel result;

processing said nPara data items by each of said respective processing units;

collating the processing results obtained by each said processing unit;

altering the overall result based on the collated result; and distributing the altered overall result to each said processing unit for further processing of other said data items.

2. The method of claim 1 wherein said selecting step is repeated after said distributing step, so that the number of data items processed by each said processing unit can be dynamically altered.

3. The method of claim 1 wherein said collating step involves taking a linear combination of the processing results obtained by each said processing unit.

4. An article of manufacture for use in a parallel data processing system for parallel processing an inherently serial program involving the sequential processing of data items and having a serial result, said article of manufacture comprising a computer-readable storage medium having a computer program embodied in said medium which may cause the computer system to:

select a number, nPara, of said data items to be processed by each of said plurality of processing units of said parallel processing system, said parallel processing units producing a parallel result being different than the serial result and with the selection of the number nPara of data items being dependent on desired degree of closeness between the parallel result and the serial result which would be attained if the program were run serially wherein the lesser number of data items selected causes greater closeness between the serial result and the parallel result;

process said nPara data items by each of said respective processing units;

collate the processing results obtained by each said processing unit;

alter the overall result based on the collated result; and distribute the altered overall result to each said processing unit for further processing of other said data items.

5. The article of manufacture of claim 4 wherein said computer program embodied in said medium additionally may cause said parallel data processing system to:

repeat said selection after said distributing step, so that the number of data items processed by each said processing unit can be dynamically altered.

6. The article of manufacture of claim 5 wherein said computer program embodied in said medium additionally may cause said parallel data processing system to:

conduct said collation by taking a linear combination of the processing results obtained by each said processing unit.

7. A computer program product for operating a parallel data processing system for parallel processing of an inherently serial program involving the sequential processing of data items and having a serial result, said computer program product comprising a storage medium having computer-readable program code embodied in said medium for causing said parallel data processing system to:

select a number, nPara, of said data items to be processed by each of said plurality of processing units of said parallel processing system, said parallel processing units producing a parallel result being different than the serial result and with the selection of the number nPara data items being dependent on desired degree of closeness between the parallel result and the serial result which would be attained if the program were run serially wherein the lesser number of data items selected causes greater closeness between the serial result and the parallel result;

process said nPara data items by each of said respective processing units;

collate the processing results obtained by each said processing unit;

alter the overall result based on the collated result; and distribute the altered overall result to each said processing unit for further processing of other said data items.

8. The computer program product of claim 7 wherein said computer-readable program code additionally may cause said parallel data processing system to:

repeat said selection after said distributing step, so that the number of data items processed by each said processing unit can be dynamically altered.

9. The computer program product of claim 8 wherein said computer-readable program code additionally may cause said parallel data processing system to:

conduct said collation by taking a linear combination of the processing results obtained by each said processing unit.

* * * * *